United States Patent
Fraser et al.

(10) Patent No.: US 7,401,044 B1
(45) Date of Patent: Jul. 15, 2008

(54) SYSTEMS AND METHODS FOR ELECTRONIC TRADING THAT PROVIDE INCENTIVES AND LINKED AUCTIONS

(75) Inventors: Stuart A. Fraser, Armonk, NY (US); Philip M. Ginsberg, New York, NY (US); Glenn D. Kirwin, Scarsdale, NY (US); Howard W. Lutnick, New York, NY (US)

(73) Assignee: CFPH, L.L.C., New York, NY (US)

( * ) Notice: Subject to any disclaimer, the term of this patent is extended or adjusted under 35 U.S.C. 154(b) by 524 days.

(21) Appl. No.: 09/593,554

(22) Filed: Jun. 14, 2000

Related U.S. Application Data (60) Provisional application No. 60/139,344, filed on Jun. 15, 1999.

(51) Int. Cl.
  *G06Q 40/00* (2006.01)
(52) U.S. Cl. .......................... 705/37; 705/35
(58) Field of Classification Search ............. 705/35–37, 705/14; 382/139
  See application file for complete search history.

(56) References Cited

U.S. PATENT DOCUMENTS

| | | | |
|---|---|---|---|
| 3,581,072 A | 5/1971 | Nymeyer .................... | 235/152 |
| 4,674,044 A | 6/1987 | Kalmus et al. .............. | 364/408 |
| 4,789,928 A | 12/1988 | Fujisaki ...................... | 364/401 |
| 5,101,353 A | 3/1992 | Lupien et al. ............... | 364/408 |
| 5,161,103 A | 11/1992 | Kosaka et al. ............... | 364/408 |
| 5,297,031 A | 3/1994 | Gutterman et al. .......... | 364/408 |
| 5,375,055 A | 12/1994 | Togher et al. ............... | 364/408 |
| 5,642,485 A * | 6/1997 | Deaton et al. ................ | 705/14 |
| 5,794,219 A | 8/1998 | Brown ......................... | 705/37 |
| 5,905,974 A | 5/1999 | Fraser et al. ................. | 705/37 |
| 5,963,923 A | 10/1999 | Garber ........................ | 705/37 |
| 6,023,686 A | 2/2000 | Brown ......................... | 705/37 |
| 6,035,287 A * | 3/2000 | Stallaert et al. .............. | 705/37 |
| 6,151,589 A | 11/2000 | Aggarwal et al. ............ | 705/37 |
| 6,307,958 B1 * | 10/2001 | Deaton et al. ............... | 382/139 |
| 6,332,126 B1 * | 12/2001 | Peirce et al. ................. | 705/14 |
| 6,421,653 B1 * | 7/2002 | May ............................ | 705/37 |
| 6,553,347 B1 * | 4/2003 | Tavor et al. .................. | 705/14 |

(Continued)

FOREIGN PATENT DOCUMENTS

EP  0 987 644 A2  3/2000

(Continued)

OTHER PUBLICATIONS

Reuters Products+Services.*

(Continued)

*Primary Examiner*—Narayanswamy Subramanian
(74) *Attorney, Agent, or Firm*—Ruth J. Ma (57) ABSTRACT

Systems and methods for electronic trading that provide incentives for gathering orders, making markets, and submitting block orders are provided. These systems and methods may first determine if the trader qualifies for an incentive. This determination may be made based upon one or more characteristics, such as price, size, duration, etc., of orders submitted to the trading system by the trader. Once the trader has been determined as being eligible for one or more incentives, the incentives that are provided may include reduced transaction costs, cash payments, priority or exclusivity in trading, self execution of transactions, etc.

36 Claims, 7 Drawing Sheets

U.S. PATENT DOCUMENTS 6,618,707 B1 * 9/2003 Gary ............................ 705/37

FOREIGN PATENT DOCUMENTS

| WO | WO 00/11589 | 3/2000 |
| WO | WO 00/21013 | 4/2000 |
| WO | WO 00/26745 | 5/2000 |

OTHER PUBLICATIONS

"Successful Investing with Fidelity Funds"-Bowers 1997.*
"Nasdaq Liffe Markets" (NQLX).*
Yao-Jen Chang and Yung-Hsin Liu, "Electronic Business System," p. 6, section 1.3.1. Taipei, Taiwan. Jan. 10, 1999.

* cited by examiner

SYSTEMS AND METHODS FOR ELECTRONIC TRADING THAT PROVIDE INCENTIVES AND LINKED AUCTIONS

BACKGROUND OF THE INVENTION

The present invention relates to systems and methods for electronic trading that provide incentives and linked auctions. More particularly, the present invention relates to systems and methods for electronic trading that provide incentives for gathering orders, making markets, and submitting block orders, and that enable linking of multiple trading auctions.

In recent years, electronic trading systems have gained wide spread acceptance for trading a wide variety of goods, services, and financial instruments. For example, electronic trading systems have been created which facilitate the trading of financial instruments and commodities such as stocks, bonds, currency, futures, oil, gold, pork bellies, etc. As another example, online auctions on the Internet have become popular markets for the exchange of services and both new and used goods. In one embodiment of systems for electronic trading of financial instruments, for example, a first trader may submit a "bid" to buy a particular number of 30 Year U.S. Treasury bonds at a given price. In response to such a bid, a second trader may "hit" the bid in order to indicate a willingness to sell bonds to the first trader at the given price. Alternatively, the second trader may submit an "offer" to sell the particular number of the bonds at the given price, and then the first trader may "take" or "lift" the offer to indicate a willingness to buy bonds from the second trader at the given price.

Advantages to trading electronically include enabling traders to remain anonymous for at least a portion of the trading process, facilitating trading among traders at different physical locations, and improving the accuracy of documenting trading activity. Nevertheless, as with any method for trading, electronic trading needs to be sufficiently efficient to prevent the costs of trading electronically from overshadowing its benefits, and sufficiently liquid in order to truly reflect the market price of items being electronically traded.

One way in which efficiency and liquidity can be improved in any trading system is by increasing the volume of orders in the trading system, increasing the amount of time during which a market is available for orders to be executed, and enabling items to be simultaneously traded independently of each other. Thus, it would be desirable to provide systems and methods which increase the volume of orders in the trading system, increase the amount of time during which a market is available for orders to be executed, and enable items to be simultaneously traded independently of each other.

SUMMARY OF THE PRESENT INVENTION

It is therefore an objective of the present invention to provide systems and methods which increase the volume of orders in the trading system, increase the amount of time during which a market is available for orders to be executed, and enable items to be simultaneously traded independently of each other.

The above and other objects of the invention are realized by providing systems and methods for electronic trading that provide incentives for gathering orders, making markets, and submitting block orders, and that enable linking of multiple auctions. In order to give a trader using the systems and methods of the present invention an incentive to gather orders, make markets and submit block orders, these systems and methods may first determine if the trader qualifies for an incentive. This determination may be made in real-time and may be based upon one or more characteristics, such as price, size, duration, etc., of orders submitted to the trading system by the trader. Once the trader has been determined as being eligible for one or more incentives, the incentives that are provided may include reduced transaction costs, cash payments, priority or exclusivity in trading, self execution of transactions, creation of linked auctions, etc. The invention may also permit a trader to view information about the incentive earned by that trader periodically or in real time.

With regard to linked auctions, before an order is eligible to be traded in a linked auction (i.e., an auction that is linked to another auction in the trading system), the order is preferably confirmed as qualifying to be auctioned in such a manner. Once an order is confirmed as qualifying for its own auction (i.e., a linked auction), a linked auction is created and preferably linked to another auction based upon a characteristic of the order, such as price. In addition to being linked, information from each auction may be made available to traders in the other auctions.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

As stated above, the present invention provides systems and methods for electronic trading that provide incentives to traders for gathering orders, making markets, and submitting block orders, and that enable linking of multiple auctions. Although the present invention is described herein as providing incentives to "traders" and being used by traders, it should be apparent that the term "trader" is meant to broadly apply to any user of a trading system, whether that user is an agent acting on behalf of a principal, a principal, an individual, a legal entity (such as a corporation), etc., or any machine or mechanism that is capable of placing and/or responding to orders in a trading system.

Preferred embodiments of the systems and methods of the present invention are now described in greater detail in connection with FIGS. 1-7. In the examples which follow, trading of U.S. Treasury bonds, notes, and bond futures are used to illustrate various aspects of the present invention. Trading of these instruments may be accomplished in both typical and block sizes delineated in prices relative to par. For example, a price may be quoted as $123 1/32 or $123.03125 per $100,000 face value for 8% U.S. Treasury Bond futures for delivery in September 2000 or $123,031.25 of futures contract value. Due to display limitations in typical trading workstations, a price of $123 1/32 may be displayed as "123.01" where the tenths and hundredths digits represent the number of 32nds. A 32nd is frequently referred to as a "tick". When a market is displayed for trading of such bond futures, the market may be shown as "101.02-03 5×25" where "101.02" is the bid price, "101.03" is the offer price, 5 million is the bid size, and 25 million is the offer size.

Notwithstanding that the present invention is illustrated with respect to trading of bonds, notes, and bond futures, it should be noted that the systems and methods of the present invention are equally applicable to the trading of any type of financial instruments, commodities, goods, services, etc.

Figure 1:
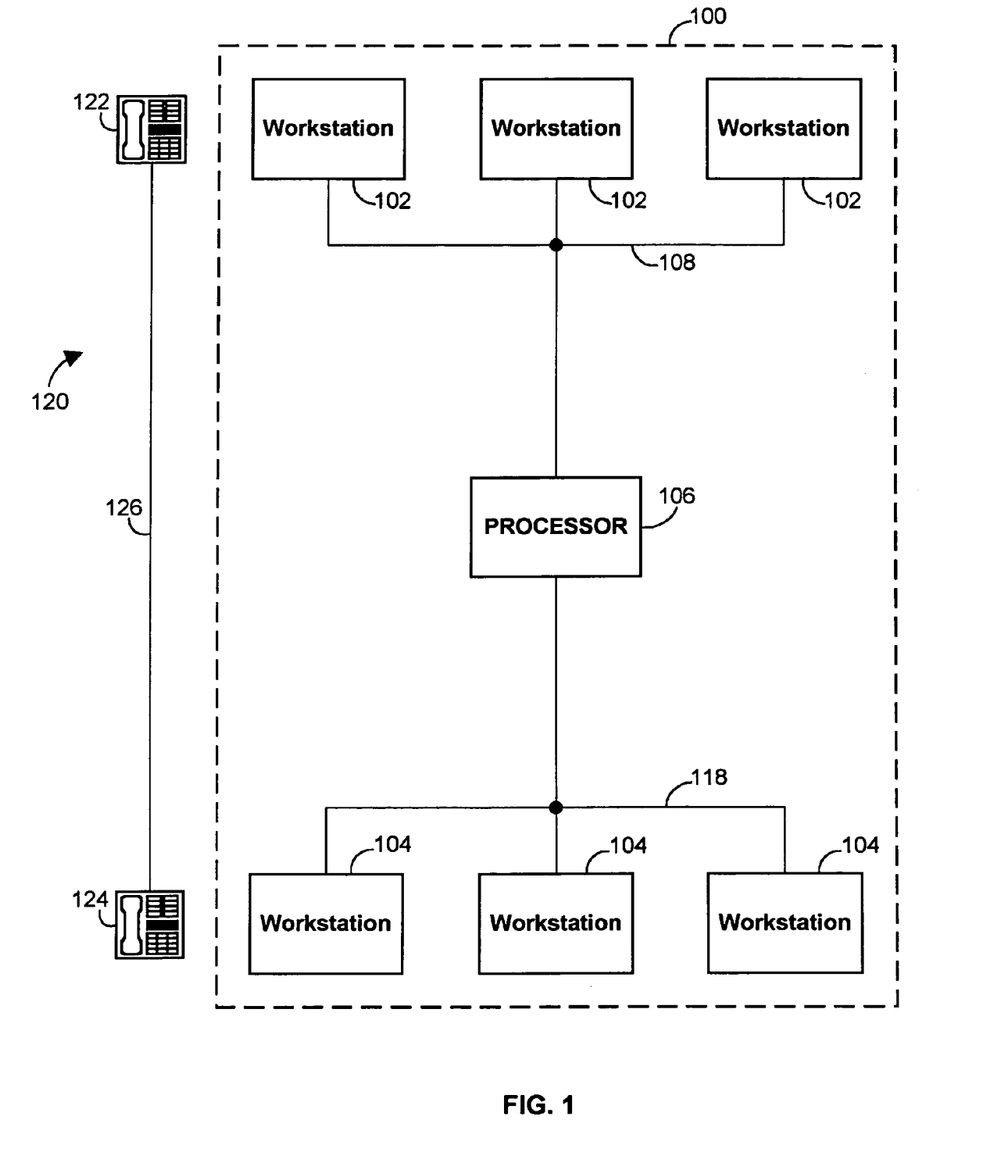
FIG. 1 is a block diagram of one embodiment of a hardware arrangement in accordance with the present invention.

Turning first to FIG. 1, an example of hardware 100 that may be used to implement one embodiment of the present invention is shown. As illustrated, hardware 100 may include one or more local workstations 102 and one or more remote workstations 104 that may be used by traders to view trading data and enter trading commands. Workstations 102 and 104 may be any suitable means for presenting data and, in preferred embodiments of this invention, accepting input. For example, workstations 102 and 104 may be personal computers, laptop computers, mainframe computers, dumb terminals, data displays, Internet browsers, Personal Digital Assistants (PDAs), two-way pagers, wireless terminals, portable telephones, etc., or any combination of the same.

To orchestrate trading between traders using workstations 102 and 104, the workstations preferably submit commands to, and receive data to be displayed from, a processor 106. In alternative embodiments, however, workstations may communicate with additional processors, or include processors to orchestrate trading in a distributed fashion without requiring processor 106. Processor 106, and any additional processors, may be any suitable circuitry or devices capable of processing data such as microprocessors, personal computers, network servers, mainframe computers, dedicated computer systems, etc.

As shown, processor 106 may be connected to workstations 102 and 104 by networks 108 and 110, respectively. Each of networks 108 and 110 may be any suitable data network for communicating data between workstations 102 and 104 and processor 106, such as a local area network, a wide area network, the Internet, an intranet, a wireless network, a hard wired connection, a dial-up network, etc., or any combination of the same. In an arrangement of hardware 100 without processor 106, workstations 102 and 104 may be linked together by networks 108 and 110 directly.

As also shown in FIG. 1, a telephone network 120 may be provided that comprises a local telephone 122 and a remote telephone 124 connected by a telephone line 126. Telephone network 120 may be used to enable a trader at a remote location to communicate with an operator at a workstation 102 or 104. This may be useful when the trader does not have access to a workstation 102 or 104 or when the trader only has access to a display-only workstation 102 or 104. Obviously, telephone network 120 may be implemented as a private telephone network, a public telephone network, a wireless telephone network, or any suitable combination of the same.

When used to implement a bid/offer, hit/take trading system as described above, hardware 100 may enable a trader to submit a bid to buy, or an offer to sell, an item at one of workstations 102 and 104. This bid or offer may then be communicated to processor 106, where the bid or offer can be ranked and stored in a bid-offer queue. The ranking may be based upon time of submission, price, or any other suitable criterion. The bid or offer may then be presented to other traders via other workstations 102 and 104 dependent upon its ranking in the bid-offer queue. Once displayed, the bid or offer can then be hit or taken by one or more of the other traders so that a trade of the item can proceed to execution.

Figure 2:
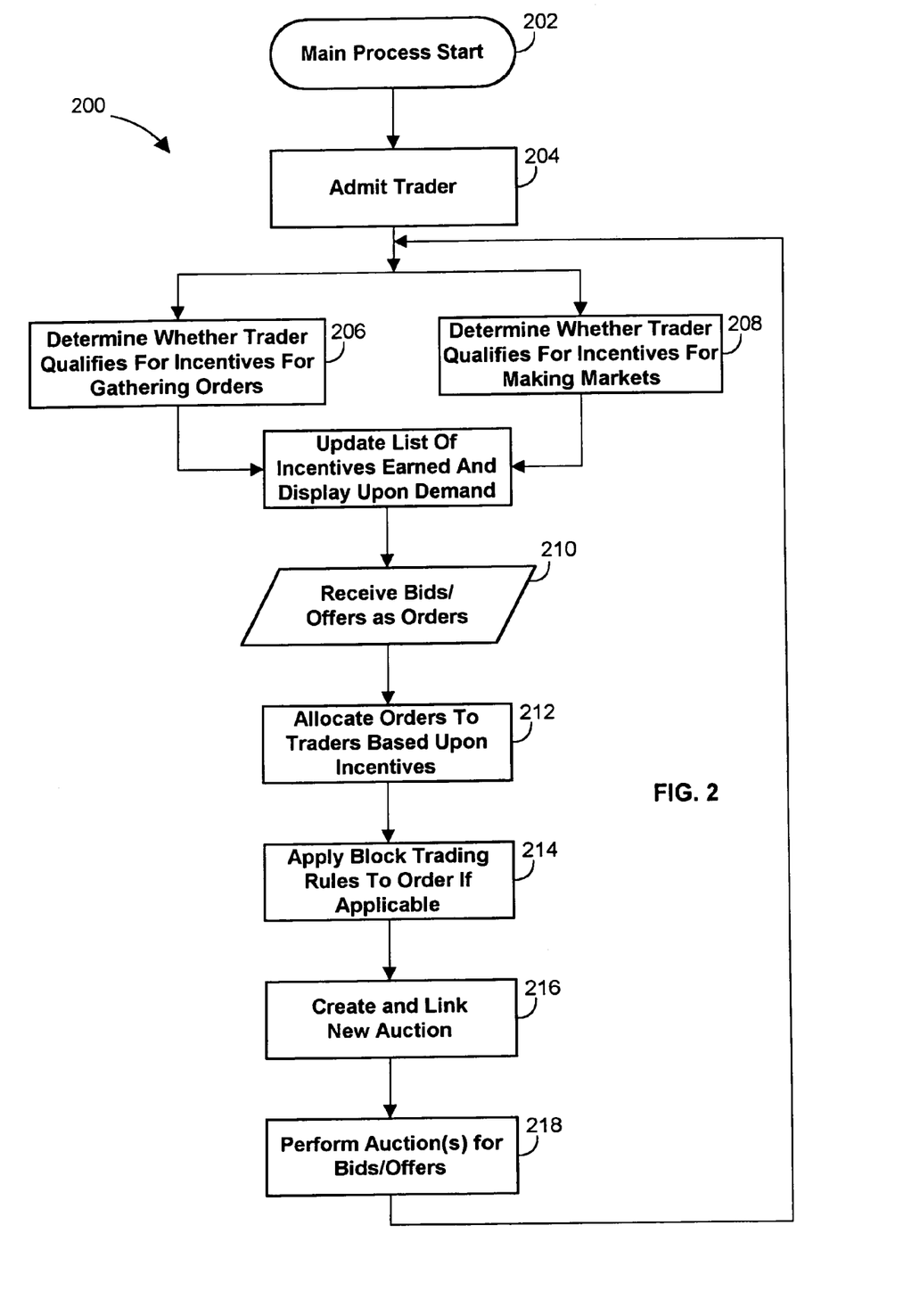
FIG. 2 is a flow diagram of a main process in accordance with one embodiment of the present invention.

Referring to FIG. 2, a process 200 for implementing one embodiment of the present invention in hardware 100 is illustrated. As shown, once process 200 has begun at step 202, a trader may be admitted at step 204. This admission may include verifying the identity of the trader, initializing related accounts of the trader, and/or any other related functions. Next, process 200 may determine whether the trader qualifies for incentives for gathering orders at step 206 (as discussed in greater detail in connection with FIG. 3) and whether the trader qualifies for incentives for making markets at step 208 (as discussed in greater detail in connection with FIG. 4). Although steps 206 and 208 are illustrated as being performed concurrently in process 200, these steps may be performed sequentially and in any order in accordance with the present invention. To a trader to know what incentives have been earned by the trader, the present invention, at step 209, preferably updates a list of incentives that have been earned by the trader and makes that list available to the trader on demand when using one of workstations 102 and 104. Once step 209 has been completed, process 200 receives bids and/or offers as orders at step 210. Next at step 212, process 200 allocates the orders to traders and provides incentives qualified for by the traders (as discussed in greater detail in connection with FIG. 5). For orders that qualify as block orders, process 200 applies block order trading rules at step 214 (as discussed in greater detail in connection with FIG. 6). For orders that qualify to be traded in a linked auction, process 200 creates and links a new auction for the order to another auction at step 216 (as discussed in greater detail in connection with FIG. 7). Finally, process 200 performs the appropriate auctions for orders at step 218 and loops back to steps 206 and 208.

Process 200 shown in FIG. 2 is only meant to illustrate one possible implementation of the present invention. Alternative embodiments may not follow the depicted flow. For example, determinations of whether a trader qualifies for incentives for gathering orders and/or making markets may be made at random intervals rather than regular intervals as shown in FIG. 2.

Figure 3:
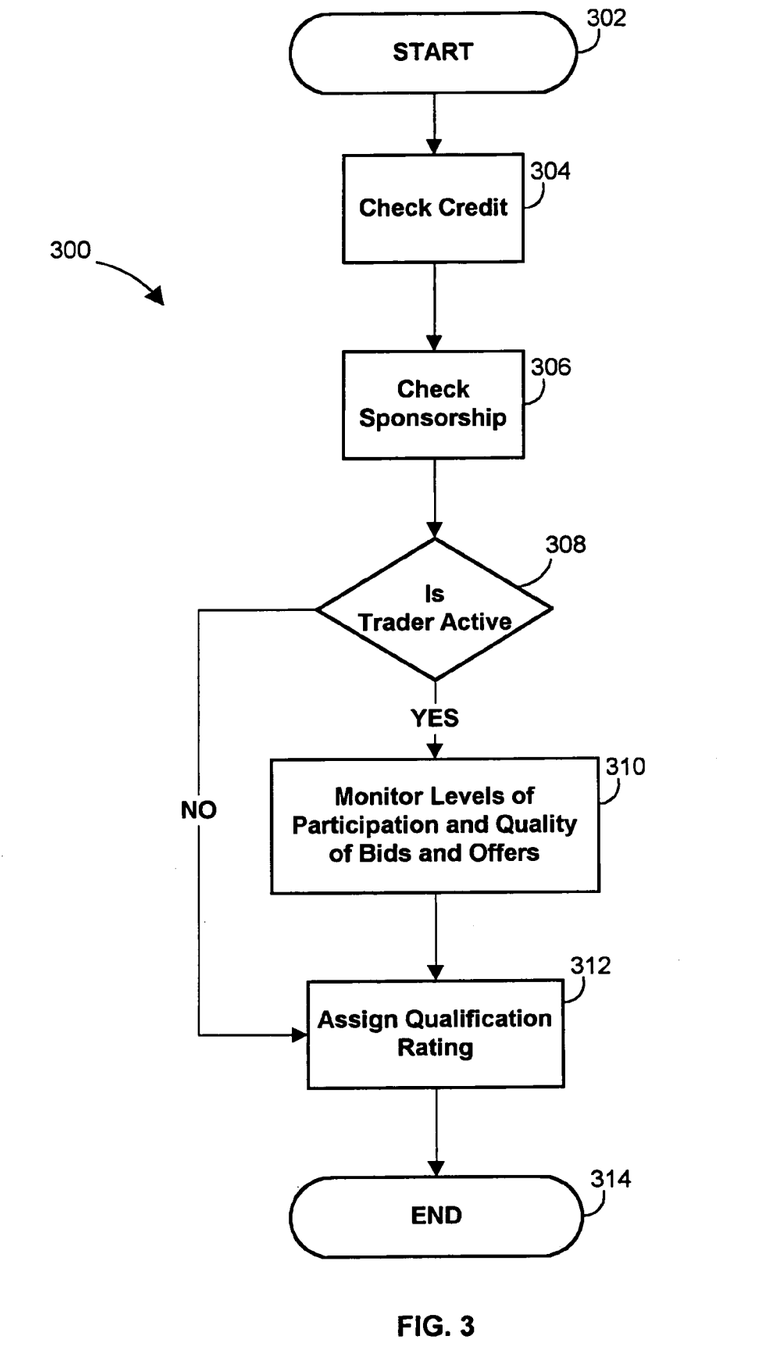
FIG. 3 is a flow diagram of a process for qualifying a trader for incentives for gathering orders in accordance with one embodiment of the present invention.

Turning to FIG. 3, a process 300 for determining whether a trader qualifies for incentives for gathering orders is illustrated. Gathering orders, or generating order flow, is important in a trading system because as the number of orders in the system increases, so does the liquidity in the system. As stated above, liquidity in a trading system is important for establishing the true market price for an item to be traded in that system. Determining whether a trader qualifies for incentives for generating order flow may include satisfaction of one or more of the following criteria:

(1) that the trader have sufficient credit acceptability;
(2) that the trader be sponsored by one or more other traders, an exchange, or an exchange's clearing corporation;
(3) that the trader meet certain value levels; and
(4) that the trader satisfy order placement and cancellation levels.

Determining whether a trader qualifies for an incentive for gathering orders is preferably performed at two times. First, the determination may be performed prior to participation, for example, by verifying credit acceptability or sponsorship by one or more other traders, an exchange, or an exchange's clearing corporation. Second, the determination may be performed during trading, for example, by monitoring, in realtime, the participation levels of bids and offers and the quality of those bids and offers (e.g., duration of time the order is exposed to the market and the frequency of cancellation commands). The latter is important because, for example, a bid order that lasts for only one second may be too short in duration to enable another trader to hit the bid and therefore tend to create noise on the other trader's display rather than reveal an intention to complete a transaction. This sort of noise should not entitle a trader to an incentive.

The determination of whether a trader qualifies for incentives for gathering orders may also be based upon the type of orders gathered, the time of entry of orders, the volume of entry of orders, the size of entries in the orders, and/or the characteristics of the originators of the orders gathered by the trader. For example, a trader may qualify for different incentives for bids versus orders, and for different incentives when a bid or offer is placed versus when a trade clears. Furthermore, the test used to determine whether a trader qualifies for incentives may be dynamically varied (e.g., based upon market conditions), and may be particular to a particular trader or group of traders.

If a trader fails to meet the necessary criteria for receiving incentives, then qualification may not be granted or may be revoked. However, if a trader does qualify for incentives, the trader may be designated as a Qualified Order Gatherer (QOG) and provided with incentives that may include various trading privileges including reduced or no transaction costs, payment of a fixed amount of money, transaction based payments (e.g., commissions), priority in a bid/offer queue, priority or exclusivity to bids/offers, etc.

As stated above, a process 300 for determining whether a trader qualifies for incentives for gathering orders is illustrated in FIG. 3. As shown, once process 300 has begun at step 302, the process may check the credit of the trader at step 304 and the sponsorship of the trader at step 306. Credit and sponsorship of a trader may be checked only once upon admission of the trader or may be checked each time process 300 is performed in the event that credit and sponsorship information is updated in real time. Next, process 300 may determine at step 308 if the trader is actively trading. The criteria used to determine whether a trader is actively trading may vary. For example, a trader may be considered active if it has placed at least a minimum number of orders during a window of time. Alternatively, a trader may be considered active if no more than a predetermined minimum of time has elapsed since the time that the last order was placed by the trader. If the trader is trading, then process 300 monitors levels of participation and the quality of bids and offers at step 310. If the trader is not trading or after step 310 has been completed, process 300 assigns a qualification rating to the trader at step 312 and terminates at step 314.

Figure 4:
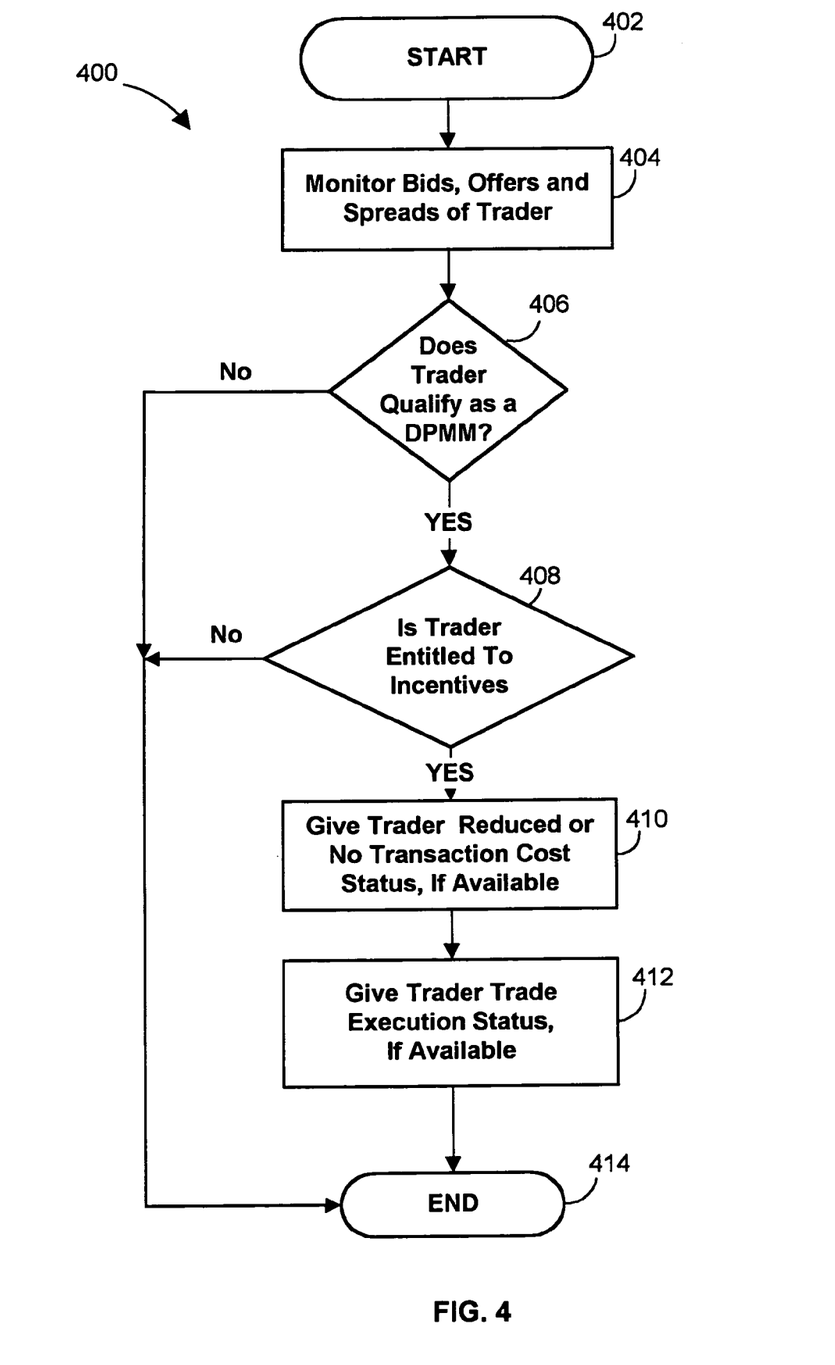
FIG. 4 is a flow diagram of a process for qualifying a trader for incentives for making markets in accordance with one embodiment of the present invention.

FIG. 4 illustrates one embodiment of a process 400 for determining whether a trader qualifies for incentives for making markets in accordance with the present invention. To determine whether a trader qualifies for these incentives, preferred embodiments of the invention may confirm that the trader has been making bids and offers that have at least a minimum designated volume and that have a spread (difference in price between bid and offer) that meets or beats one or more parameters. For example, to be entitled to incentives, a trader may be required to provide substantially continuous bid and offer prices having spreads that fall within a given set of limits. The limits, in this example, may require a one tick (i.e., $\frac{1}{32}$ or 0.03125) price spread for bids and offers over the course of 50% of the trading day. Alternatively, a trader may qualify for incentives for merely making one side of a market (e.g., the bid or offer side).

Obviously, in accordance with the present invention, a wide variety of tests or combination of tests may be used to determine whether a trader qualifies for incentives for making markets, including monitoring the price, size, duration, and cancellation of bids and offers submitted by the trader, the creditworthiness of the trader, etc. Moreover, this test or these tests may be applied to a trader only once, periodically, or in real time.

In preferred embodiments, a trader meeting the market making qualification test may then be entitled to incentives and designated as a Designated Primary Market Maker (DPMM), and a trader failing to meet this test may not be granted incentives and DPMM status or may have an entitlement to those incentives and DPMM status revoked.

Incentives may include various trading privileges including reduced or no transaction costs, payment of a fixed amount of money, transaction based payments (e.g., commissions), priority in a bid/offer queue, priority or exclusivity to bids/offers, etc.

Because a DPMM may play a dual role as both an order gatherer for other traders and as a principal for its own account, the DPMM may also be granted the option of executing certain transactions itself. For example, assume that an auction process in the trading system has a bid for $50 million at a price of 101.01 and an offer for $25 million at a price of 101.02, wherein the offer is made up in part of an offer for $5 million at 101.02 by a DPMM. Then, a customer bid order comes into the DPMM for $5 million at a bid price of 101.02. In the auction process, this new better bid would lock the market at 101.02-02 5×25. However, a trade might not take place because there is no bid/offer and hit/take combination. Nevertheless, because the DPMM has both a bid (the customer's) and an offer (the DPMM's) that match, a trade execution may be permitted to be instituted by the DPMM externally to the auction process.

As another example, a DPMM may be provided with the ability to initiate private auctions for orders as an incentive for making markets. In preferred embodiments of the invention, these auctions may be linked to a main auction as described in connection with FIG. 7.

The DPMM may also be given control over the option to execute transactions so that the DPMM retains a percentage of the orders for execution or passes them on to an auction process in the trading system. The invention is not limited to any one order allocation scheme and can be dynamic in nature, e.g., orders may be retained when the market is active. To facilitate the option chosen, the auction process in the trading system is preferably linked to an auction process of the DPMM. While the auction process in the trading system may use an interactive trading system, wherein bids and offers that are placed may be hit and taken, respectively, to initiate trades, the DPMM may invoke a different matching algorithm (or any other suitable method for trading) for its own customers' orders.

As stated above, a process 400 for determining whether a trader qualifies for incentives for making markets is illustrated in FIG. 4. After process 400 has begun at step 402, the process monitors bids, offers, and spreads of a trader at step 404. Next, at step 406, process 400 determines if the trader qualifies as a DPMM. If the trader does not qualify, incentives may not be granted or may be revoked and process 400 terminates at step 414. If the trader does qualify as a DPMM, however, process 400 next determines at step 408 whether the DPMM is entitled to an incentive. If the DPMM is not entitled to an incentive, process 400 terminates at step 414. If the DPMM is entitled to an incentive, process 400 may then give the trader statuses such as reduced or no transaction cost status at step 410 and trade execution status at step 412 to facilitate receipt of the corresponding incentive. Naturally, other statuses for incentives may additionally or alternatively be granted in accordance with the present invention. Once these statuses have been given, process 400 terminates at step 414.

After a trader has been determined as qualifying for incentives for either gathering orders or making markets, the systems and methods of the present invention may then provide the corresponding incentives to the trader. As stated above, these incentives may include various trading privileges including reduced or no transaction costs, payment of a fixed amount of money, transaction based payments, priority in a bid/offer queue, priority or exclusivity to bids/offers, ability and option to execute trades, etc. For example, one form of an incentive that may be granted is a priority in the bid-offer queue. Such a priority may increase the probability that a transaction will be completed for a trader.

In the event that two or more traders are simultaneously entitled to a priority incentive, the present invention may either allocate the incentive to each trader at a different time (e.g., sequentially based upon which trader became entitled to the priority first), or allocate the incentive to the traders concurrently. For example, in the latter case, if a trader wants to buy $10 million of the most recently auctioned 5 year treasury notes, and a first DPMM and a second DPMM each desire to sell $10 million, then the trader will buy $5 million from the first DPMM and $5 million from the second DPMM. Alternative allocations of priority to the DPMMs are also possible, e.g., random selection full priority to one of the DPMMs from among the group of DPMMs.

Similarly, when different types of incentives are due to different traders, the present invention may provide one of the incentives to one of the traders at the expense of the other. For example, assume that an order comes into a QOG from a trader to buy $10 million of the most recently auctioned 5 year treasury notes at the market price. The trading system may allow the QOG to fill some portion of the order (e.g., 60%), notwithstanding a priority held by a DPMM. Once the QOG has filled a portion of the order, the DPMM may then be permitted to fill a remaining portion of the order (e.g., the remaining 40%).

How incentives are allocated to traders concurrently entitled thereto may be a function of trade size, time of day, trader type, order type, execution performance, etc., or any combination of the same.

Figure 5:
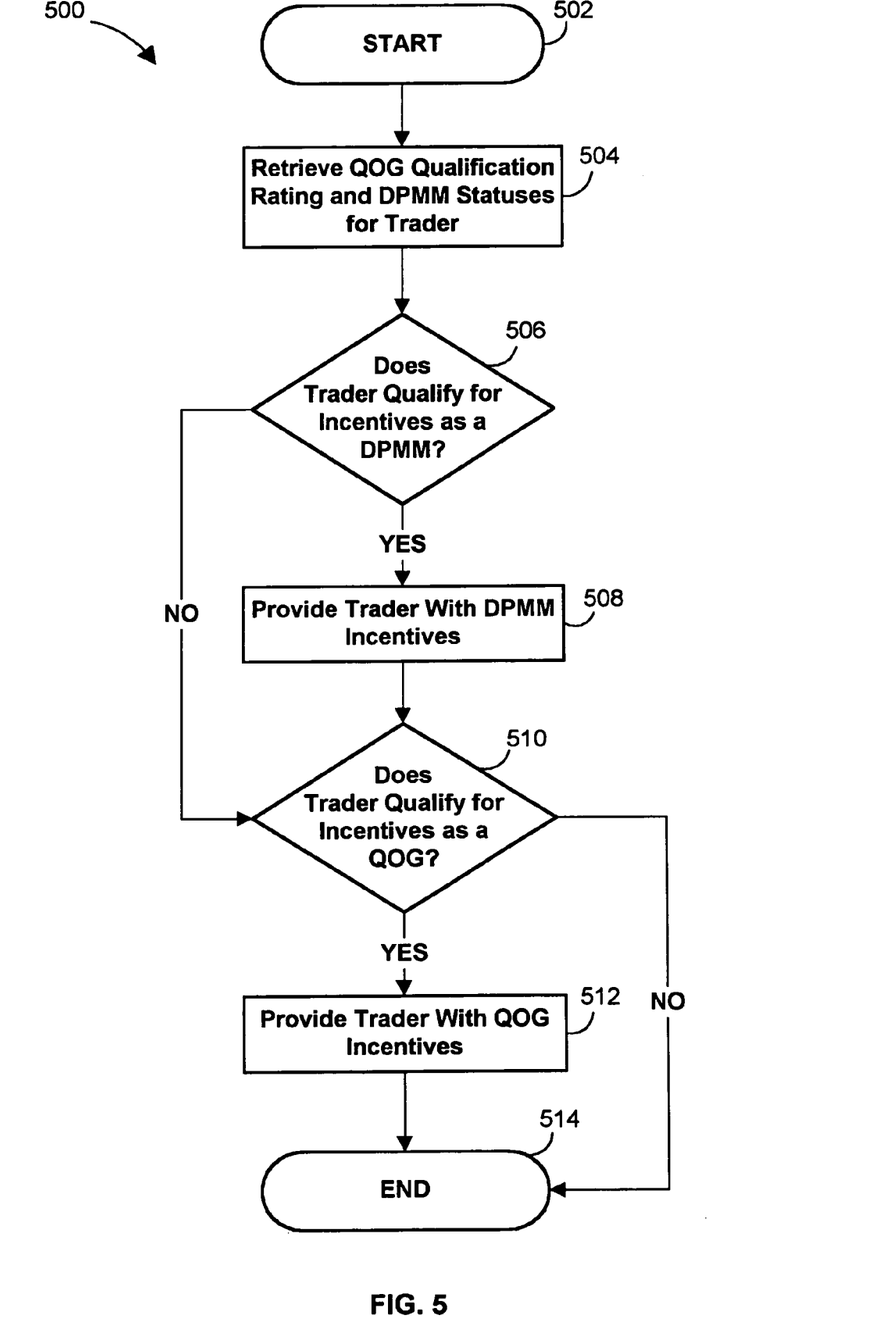
FIG. 5 is a flow diagram of a process for allocating incentives to traders in accordance with one embodiment of the present invention.

One example of a process for allocating incentives to traders in accordance with the present invention is illustrated in FIG. 5. As shown, once process 500 has begun at step 502, the process retrieves the QOG qualification rating and DPMM statuses of a trader in question. The QOG qualification rating may be determined by a process such as process 300 which is described above and illustrated in FIG. 3, and the DPMM statuses may be determined by a process such as process 400 which is described above and illustrated in FIG. 4. Next at step 506, process 500 determines if the trader qualified for incentives as a DPMM. If the trader did qualify for one or more incentives as a DPMM, then process 500 provides the corresponding incentives to the trader at step 508. However, if the trader did not qualify for incentives or after a DPMM incentive has been allocated to the trader, process 500 then determines at step 510 if the trader qualified for incentives as a QOG. If the trader did qualify for one or more incentives as a QOG, then process 500 provides the corresponding incentives to the trader at step 512. Finally, if the trader did not qualify for incentives or after a QOG incentive has been allocated to the trader, then process 500 terminates at step 514.

Figure 6:
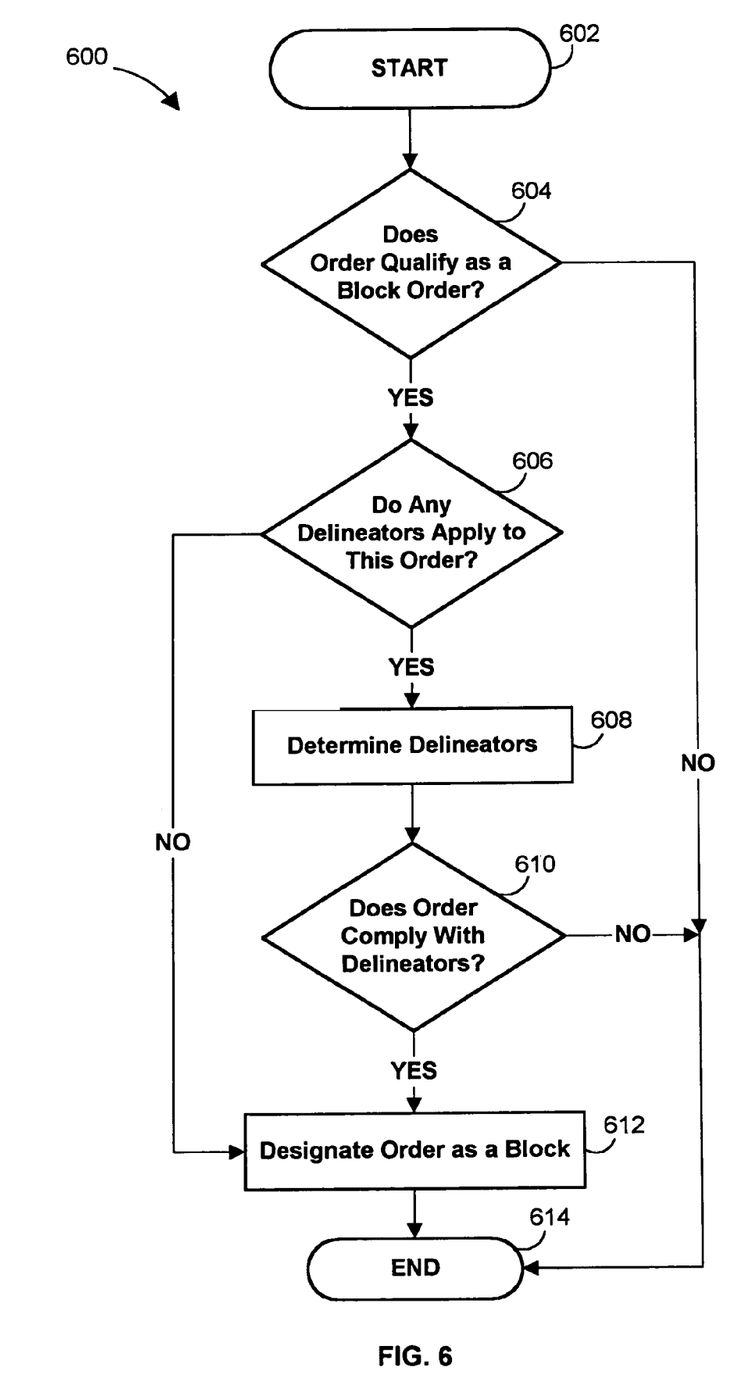
FIG. 6 is a flow diagram of a process for processing block orders in accordance with one embodiment of the present invention.

Turning to FIG. 6, a process 600 for processing block orders in accordance with one embodiment of the present invention is illustrated. Block orders are orders that may be traded outside the normal market for that type of order, typically because of the size of the order. For example, when a first trader desires to trade an extraordinarily large size of bonds, that trader may be permitted to submit an order requesting that another trader bid or offer their best price for those bonds rather than requiring that the first trader submit a bid or offer order for the bonds. In this way, the block order is entitled to preferential treatment because of its size.

For an order to qualify as a block order, a variety of tests may be performed on the order. For example, the order may have to be for a certain instrument, for at least a certain size, for at least a certain minimum or at most a maximum price, etc. Once an order qualifies as a block order, the order may then be entitled to preferential treatment. In addition to qualifying orders as block orders, the present invention may also apply delineators to the block order to control the price range, size range, time components (e.g., a minimum period for which the block must be available to be hit/taken), etc. of the order.

For example, a price range delineator may only allow a trade for a block order at a particular time to be consummated between prices of 101.01 and 101.02. As another example, upper and lower bounds may limit the range associated with the spread for a block order between the best bid (highest bid) and best offer (lowest offer) for similar items. As a more particular example, the present invention may generate a lower bound and an upper bound that are one tick below and one tick above, respectively, the minimum one tick spread. In the example above, assume the best bid was 101.01 and the best offer was 101.02, for a spread of 0.01. The upper bound would then be 101.03 and the lower bound would be 101.00. Setting the upper and lower bound in this way has the effect of widening the permissible range within which a DPMM could execute a block trade. Further to the above example, if an order came into a DPMM to buy $25 million of the most recently auctioned U.S. Treasury notes while the best bid and best offer were 101.01 and 101.02, respectively, for $5 million on each side, then the DPMM could fill the $25 million order directly at a price of 101.03 since the $25 million order would be a qualified block order.

As stated above, one example of a process for processing block orders in accordance with the present invention is illustrated in FIG. 6. As shown, once process 600 has begun at step 602, the process determines at step 604 whether the order qualifies as a block order. As mentioned above, this determination may be based upon the order instrument, price, size, etc. If the order does qualify as a block order, process 600 determines if any delineators apply to this order at step 606, otherwise process 600 will terminate at step 614. If the order does qualify as a block order and no delineators apply to the order, then the order is designated as a block order at step 612 and process 600 terminates at step 614. If the order does qualify as a block order and delineators do apply to the order, however, the delineators are then determined at step 608. Next, process 600 determines if the order complies with the delineators at step 610. If the order does not comply, then process 600 terminates at step 614. Otherwise, the order is designated as a block order at step 612 and process 600 terminates at step 614.

If after process 600, an order is designated as a block order, then the order may be treated as a block in a subsequent auction process such as that illustrated in step 218 of FIG. 2.

As mentioned above, liquidity and transaction volume can be enhanced by allowing multiple simultaneous buy/sell transactions to take place should the corresponding market situation arise. By allowing more than one transaction or auction process, efficiencies in the trading system can be achieved.

For example, assume that a first trader and a second trader are working-up a trade (i.e., adding additional size to a trade that has already initially been completed as part of an auction) by buying and selling in increments of $5 million of the most recently auctioned five year U.S. Treasury note. At the same time, a DPMM receives an order to buy $5 million worth of the same note from a third trader. By granting an incentive to the DPMM, a private auction may be permitted to take place between the DPMM and the third trader at the same time that the auction between the first trader and the second trader is progressing. By allowing two auction processes to coexist within one market, at the same time, greater liquidity and market efficiency can be attained.

Preferred embodiments of the present invention allow multiple auction processes to occur at the same time while linking one or more of their characteristics. These multiple auction processes may all be occurring in processor 106 (see FIG. 1) or some may be occurring in a processor external but linked to processor 106. The particular method for performing each of the multiple auction processes may be the same or different. For example, the auction process may all use interactive matching, wherein bids and offers are hit and taken, respectively, by an aggressor. Alternatively, one auction process may use interactive matching while another auction process uses another form of matching. Other types of multiple auction processes may also be linked.

Linking of the multiple auction processes preferably requires that some aspect of the auction processes other than a main auction process be controlled by the main auction process. For example, the main auction process may control the price range, size range, time components, etc. of transactions in the other auction processes. As a more particular example, the price range for items in a second auction process may be required to remain within the range of prices in the main auction process. Additionally, information from any auction (e.g., price, size, time, etc.) may be conveyed to traders in other auctions in preferred embodiments of the present invention. In this way, traders can become aware of the best bids/offers or a concurrent buy or sell in other auction process in which they are not participating.

Figure 7:
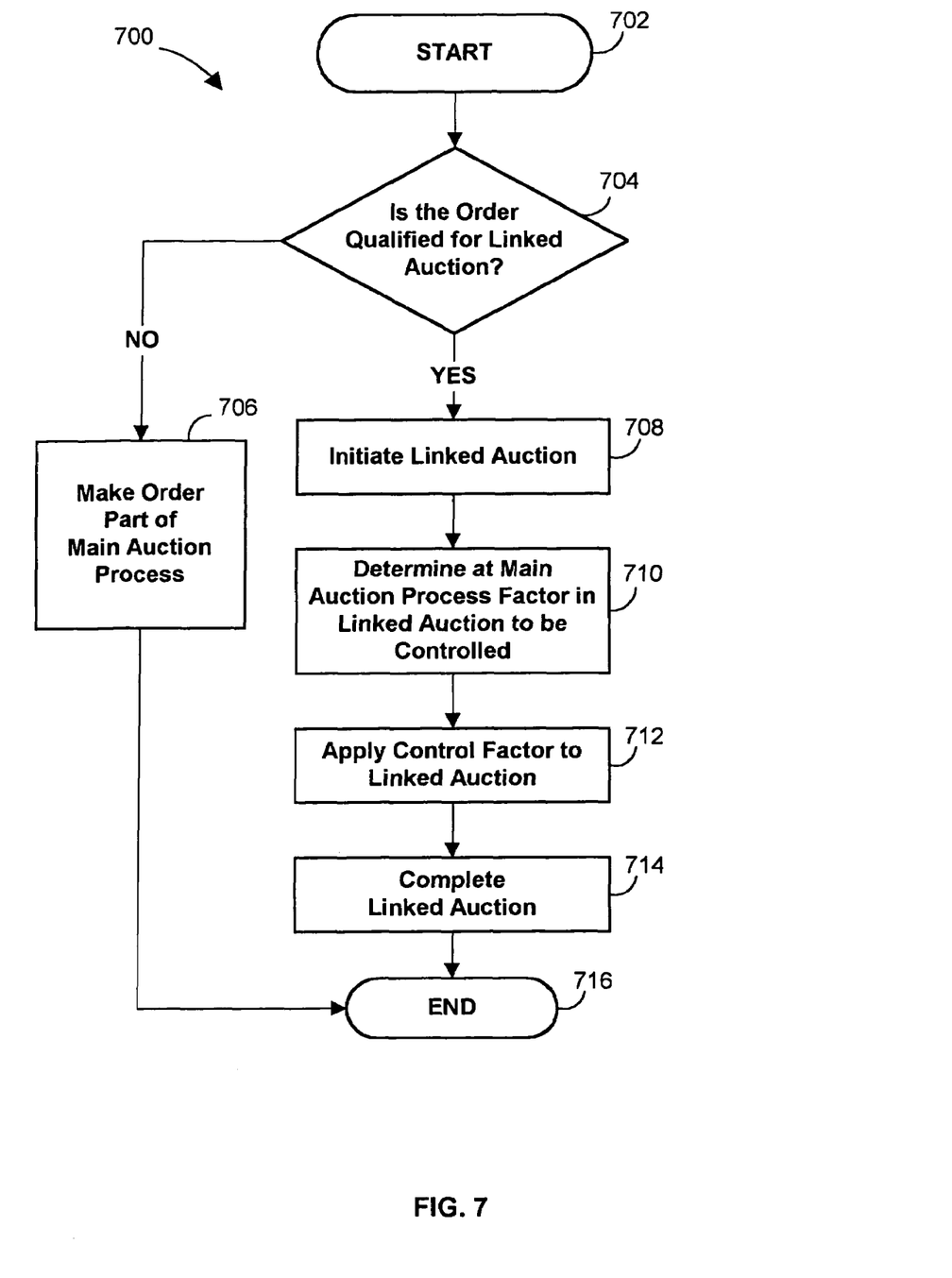
FIG. 7 is a flow diagram of a process for linking separate auctions of items in accordance with one embodiment of the present invention.

One example of a process for linking multiple auctions in accordance with the present invention is illustrated in FIG. 7. As shown, once process 700 has begun at step 702, the process determines whether one or more orders are eligible for a linked auction at step 704. For example, one or more block orders may be allowed to be traded in linked auctions. If an order is not eligible, the order is made part of a main auction process at step 706 and then process 700 terminates at step 716. Otherwise, a linked auction is initiated at step 708. Next, process 700 determines at step 710 a factor in the linked auction to be controlled by the main auction process. For example the main auction process may control price, size, or time of transactions in the linked auction process. This factor control is then applied to the linked auction process at step 712. Finally, the linked auction process completes at step 714 and then process 700 terminates at step 716.

Although the invention has been described in detail for the purpose of illustration, it should be understood that such detail is solely for that purpose and that variations can be made therein by those skilled in the art without departing from the spirit and scope of the invention except as it may be limited by the claims which follow.

What is claimed is:

1. An apparatus comprising:
a processor; and
a memory that stores instructions, in which each of the instructions is executable by the processor and includes:
   instructions that direct the processor to apply a test to a plurality of orders that are submitted by a trader, in which the test is based on a volume of the plurality of orders;
   instructions that direct the processor to determine, based on a first result from the applied test, that the trader qualifies for an incentive, in which the incentive comprises executing orders that are submitted by the trader before executing orders that are submitted by at least one other trader, in which the trader's orders are submitted after the other trader's orders have been submitted, and the incentive expires after a period of time;
   instructions that direct the processor to receive a first order that is submitted by the trader before the period of time has expired, in which the first order is received after a second order that is submitted by the other trader has been received;
   instructions that direct the processor to execute the first order before executing the second order;
   after the period of time has expired, instructions that direct the processor to apply the test to the plurality of orders that are submitted by the trader;
   instructions that direct the processor to determine, based on a second result from the applied test, that the trader does not qualify for the incentive;
   instructions that direct the processor to receive a third order that is submitted by the trader after the period of time has expired;
   instructions that direct the processor to receive a plurality of orders that are submitted by the other trader after the period of time has expired; and
   instructions that direct the processor to execute the third order and the other trader's plurality of orders in order of receipt.

2. The apparatus of claim 1, in which the test comprises:
calculating a size of the plurality of orders that are submitted by the trader; and
determining that the calculated size exceeds a first value.

3. The apparatus of claim 1, in which the test comprises:
calculating a duration of the plurality of orders that are submitted by the trader; and
determining that the calculated duration exceeds a second value.

4. The apparatus of claim 1, in which the test comprises:
calculating a quantity of cancellations that are submitted by the trader, in which each cancellation corresponds to an order that was previously submitted by the trader; and
determining that the quantity does not exceed a third value.

5. The apparatus of claim 1, in which each of the instructions further includes:
instructions that direct the processor to evaluate a likelihood of the trader to default on a loan;
instructions that direct the processor to assign a credit rating to the trader based on the calculated likelihood; and
instructions that direct the processor to determine that the credit rating exceeds a minimum value.

6. The apparatus of claim 1, in which each of the instructions further includes:
   instructions that direct the processor to provide, concurrently, the incentive to the trader and a second incentive to a second trader.

7. The apparatus of claim 1, in which each of the instructions further includes:
   instructions that direct the processor to notify the trader, in real-time, that at least one incentive has been earned.

8. The apparatus of claim 1, in which each of the instructions further includes:
   instructions that direct the processor to wait to execute the second order after the period of time has expired.

9. The apparatus of claim 1, in which each of the instructions further includes:
   instructions that direct the processor to receive a fourth order that is submitted by the other trader after the period of time has expired, in which the fourth order is received before the third order has been received; and
   instructions that direct the processor to execute the fourth order before executing the third order.

10. The apparatus of claim 1, in which the test comprises:
    calculating a quantity of orders that are submitted by the trader after a first time interval and before a second time interval; and
    determining that the quantity exceeds a fourth value.

11. The apparatus of claim 1, in which the first order comprises a bid that is submitted in response to an offer, in which the bid comprises a first price and the offer comprises a second price.

12. The apparatus of claim 11, in which each of the instructions further includes:
    instructions that direct the processor to calculate a difference between the first price and the second price; and
    instructions that direct the processor to determine that the difference does not exceed a fifth value.

13. An article of manufacture comprising:
    a storage medium, in which the storage medium stores instructions, which when executed by a processor, direct the processor to:
        apply a test to a plurality of orders that are submitted by a trader, in which the test is based on a volume of the plurality of orders;
        determine, based on a first result from the applied test, that the trader qualifies for an incentive, in which the incentive comprises executing orders that are submitted by the trader before executing orders that are submitted by at least one other trader, in which the trader's orders are submitted after the other trader's orders have been submitted, and the incentive expires after a period of time;
        receive a first order that is submitted by the trader before the period of time has expired, in which the first order is received after a second order that is submitted by the other trader has been received;
        execute the first order before executing the second order;
        after the period of time has expired, apply the test to the plurality of orders that are submitted by the trader;
        determine, based on a second result from the applied test, that the trader does not qualify for the incentive;
        receive a third order that is submitted by the trader after the period of time has expired;
        receive a plurality of orders that are submitted by the other trader after the period of time has expired; and
        execute the third order and the other trader's plurality of orders in order of receipt.

14. The article of manufacture of claim 13, in which the test comprises:
    calculating a size of the plurality of orders that are submitted by the trader; and
    determining that the calculated size exceeds a first value.

15. The article of manufacture of claim 13, in which the test comprises:
    calculating a duration of the plurality of orders that are submitted by the trader; and
    determining that the calculated duration exceeds a second value.

16. The article of manufacture of claim 13 in which the test comprises:
    calculating a quantity of cancellations that are submitted by the trader, in which each cancellation corresponds to an order that was previously submitted by the trader; and
    determining that the quantity does not exceed a third value.

17. The article of manufacture of claim 13, in which the storage medium further stores instructions, which when executed by the processor, direct the processor to:
    evaluate a likelihood of the trader to default on a loan;
    assign a credit rating to the trader based on the calculated likelihood; and
    determine that the credit rating exceeds a minimum value.

18. The article of manufacture of claim 13, in which the storage medium further stores instructions, which when executed by the processor, direct the processor to:
    wait to execute the second order after the period of time has expired.

19. The article of manufacture of claim 13, in which the storage medium further stores instructions, which when executed by the processor, direct the processor to:
    receive a fourth order that is submitted by the other trader after the period of time has expired, in which the fourth order is received before the third order has been received; and
    execute the fourth order before executing the third order.

20. The article of manufacture of claim 13, in which the test comprises:
    calculating a quantity of orders that are submitted by the trader after a first time interval and before a second time interval; and
    determining that the quantity exceeds a fourth value.

21. The article of manufacture of claim 13, in which the first order comprises a bid that is submitted in response to an offer, in which the bid comprises a first price and the offer comprises a second price.

22. The article of manufacture of claim 21, in which the storage medium further stores instructions, which when executed by the processor, direct the processor to:
    calculate a difference between the first price and the second price; and
    determine that the difference does not exceed a fifth value.

23. The article of manufacture of claim 13, in which the storage medium further stores instructions, which when executed by the processor, direct the processor to:
    provide, concurrently, the incentive to the trader and a second incentive to a second trader.

24. The article of manufacture of claim 13, in which the storage medium further stores instructions, which when executed by the processor, direct the processor to:
    notify the trader, in real-time, that at least one incentive has been earned.

25. An electronic trading system comprising:
    at least one computing workstation coupled to a central processing unit via a network, wherein the central processing unit is configured to:

apply a test to a plurality of orders that are submitted by a trader, in which the test is based on a volume of the plurality of orders;

determine, based on a first result from the applied test, that the trader qualifies for an incentive, in which the incentive comprises executing orders that are submitted by the trader before executing orders that are submitted by at least one other trader, in which the trader's orders are submitted after the other trader's orders have been submitted, and the incentive expires after a period of time;

receive a first order that is submitted by the trader before the period of time has expired, in which the first order is received after a second order that is submitted by another trader has been received;

execute the first order before executing the second order;

apply, after the period of time has expired, the test to the plurality of orders that are submitted by the trader;

determine, based on a second result from the applied test, that the trader does not qualify for the incentive;

receive a third order that is submitted by the trader after the period of time has expired;

receive a plurality of orders that are submitted by the other trader after the period of time has expired; and execute the third order and the other trader's plurality of orders in order of receipt.

26. The system of claim 25, in which the test comprises:
calculating a size of the plurality of orders that are submitted by the trader; and
determining that the calculated size exceeds a first value.

27. The system of claim 25, in which the test comprises:
calculating a duration of the plurality of orders that are submitted by the trader; and
determining that the calculated duration exceeds a second value.

28. The system of claim 25, in which the test comprises:
calculating a quantity of cancellations that are submitted by the trader, in which each cancellation corresponds to an order that was previously submitted by the trader; and
determining that the quantity does not exceed a third value.

29. The system of claim 25, in which the central processing unit is further configured to:
evaluate a likelihood of the trader to default on a loan;
assign a credit rating to the trader based on the calculated likelihood; and
determine that the credit rating exceeds a minimum value.

30. The system of claim 25, in which the central processing unit is further configured to:
wait to execute the second order after the period of time has expired.

31. The system of claim 25, in which the central processing unit is further configured to:
receive a fourth order that is submitted by the other trader after the period of time has expired, in which the fourth order is received before the third order has been received; and
execute the fourth order before executing the third order.

32. The system of claim 25, in which the test comprises:
calculating a quantity of orders that are submitted by the trader after a first time interval and before a second time interval; and
determining that the quantity exceeds a fourth value.

33. The system of claim 25, in which the first order comprises a bid that is submitted in response to an offer, in which the bid comprises a first price and the offer comprises a second price.

34. The system of claim 33, in which the central processing unit is further configured to:
calculate a difference between the first price and the second price; and
determine that the difference does not exceed a fifth value.

35. The system of claim 25, in which the central processing unit is further configured to:
provide, concurrently, the incentive to the trader and a second incentive to a second trader.

36. The system of claim 25, in which the central processing unit is further configured to:
notify the trader, in real-time, that at least one incentive has been earned.

* * * * *